United States Patent [19]

Krass, Jr. et al.

[11] Patent Number: 4,853,850

[45] Date of Patent: Aug. 1, 1989

[54] VEHICLE COMPUTER DIAGNOSTIC INTERFACE APPARATUS

[76] Inventors: James E. Krass, Jr., 921 Canterbury, Grosse Pointe Woods, Mich. 48236; James F. Neely, 61989 Romeo Plank, Washington, Mich. 48094

[21] Appl. No.: 774,348

[22] Filed: Sep. 10, 1985

[51] Int. Cl.⁴ .................. G06F 13/00; G06F 13/42
[52] U.S. Cl. .................................. 364/200; 364/424.1
[58] Field of Search .............. 364/200 MS File, 424, 364/424.1, 900 MS File

[56] References Cited

U.S. PATENT DOCUMENTS

| | | | |
|---|---|---|---|
| 4,43,846 | 4/1984 | Adcock | 364/200 |
| 4,072,850 | 2/1978 | McGlynn | |
| 4,125,894 | 11/1978 | Cashel et al. | |
| 4,149,148 | 4/1979 | Miller et al. | |
| 4,179,740 | 12/1979 | Malin | |
| 4,188,618 | 2/1980 | Weisbart | |
| 4,236,215 | 11/1980 | Callahan et al. | |
| 4,258,421 | 3/1981 | Juhasz et al. | |
| 4,267,569 | 5/1981 | Baumann et al. | |
| 4,270,174 | 5/1981 | Karlin et al. | |
| 4,271,402 | 6/1981 | Kastura et al. | 340/52 F |
| 4,309,754 | 1/1982 | Dinwiddie, Jr. | 364/200 |
| 4,309,900 | 1/1982 | Kreft et al. | |
| 4,317,106 | 2/1982 | Huber | |
| 4,328,546 | 5/1982 | Kreft et al. | |
| 4,371,932 | 2/1983 | Dinwiddie et al. | 364/200 |
| 4,509,115 | 4/1985 | Manton et al. | 364/200 |
| 4,509,140 | 4/1985 | Cheung | 364/900 |
| 4,602,127 | 7/1986 | Neely et al. | |
| 4,616,310 | 10/1986 | Dill et al. | 364/200 |

OTHER PUBLICATIONS

"Motorola Semiconductors", Motorola Semiconductor Products, Inc., 1981.

*Primary Examiner*—Gary V. Harkcom
*Assistant Examiner*—Christopher H. Lynt
*Attorney, Agent, or Firm*—Harness, Dickey & Pierce

[57] ABSTRACT

The communications adapter provides an interface between automotive vehicle on-board computer and a test computer running diagnostic software. Using a dual-ported random access memory, the circuit receives serial data from the on-board computer, preprocesses that data into a standardized data format, and places the standardized data directly into the memory space of the test computer. The dual-ported memory may be placed at a user selected address within the memory space of the test computer, so that it will not conflict with the diagnostic program running on the test computer. The invention is readily upgradable by uploading preprocessor software into random access memory, thereby making the invention upwardly compatible as new makes and models are introduced.

22 Claims, 4 Drawing Sheets

VEHICLE COMPUTER DIAGNOSTIC INTERFACE APPARATUS

BACKGROUND AND SUMMARY OF THE INVENTION

The present invention relates generally to vehicular diagnostic systems and particularly to a computer interface apparatus for communicating between the on-board vehicle computer system and a computer equipped test head.

With the advent of motor vehicles being equipped with computer control systems by the manufacturer, the repair of malfunctions has become substantially more sophisticated than in the past. In order for the vehicle computer to properly perform its control functions, it typically interrogates a variety of sensors which are used to monitor various vehicle operating parameters. In several of these vehicle computer systems, as many as twenty or more sensors are employed for control purposes and to assist on-board diagnosis by the vehicle computer, so that an immediate warning may be displayed to the vehicle operator.

Additionally, some vehicle computer systems employ several separate microprocessor-based computer devices which cooperate with one another in providing the vehicle control functions. By the year 1987, it is expected that the vehicular computer system will comprise on the order of ten or eleven separate microprocessor-based computers. Through multiplexing techniques, these separate computers, and their associated sensors and actuators, will communicate via a single serial data bus implemented using a simple three-wire circuit (common, 12 volt and ground) within the vehicle. Through such multiplexing techniques the complex wiring harnesses found on most present day vehicles, and the attendant circuit tracing and trouble shooting problems, are expected to be all but eliminated.

To some extent the foregoing multiplexing techniques have already been utilized in todays vehicles, primarily in communicating between the vehicle computer system and its sensors. Communication is performed by transmitting digital data in a serial format, typically at a baud rate of 160, i.e., approximately 16 characters per second.

In many vehicle models, there is provided a means for obtaining direct access to the monitored parameter data, on a real time basis, so that various display tools, engine analyzers and so forth may be used to facilitate a more complete diagnosis than that provided by the on-board vehicle computer. For example, in many General Motors vehicle models, an Assembly Line Communication Link (ALCL) terminal is installed under the dashboard of the vehicle in the passenger compartment. This ALCL terminal is connected to an input/output (IO) port of the vehicle computer or to an electronic control module (EOM), to permit the transmission of monitored parameter data to the ALCL terminal upon reception of the appropriate data enable signal at the ALCL terminal.

In the past, hand-held display tools have been employed to selectively display the value or status of individual parameters. For a further discussion of such hand-held display tools, reference may be had to commonly assigned patent U.S. Pat. No. 4,602,127, entitled "Diagnostic Data Recorder", by James F. Neely and James E. Krass, Jr., filed Mar. 9, 1984, which patent is hereby incorporated by reference. As noted above, present day vehicle computer systems communicate parameter data serially at a baud rate of 160. At such baud rates, hand-held display tools are generally useful. However, with the prospect of much greater use of computers in future vehicle models, it becomes apparent that hand-held display tools will be inadequate. First, with a large number of individual computers all competing for use of the serial data bus (three-wire conductor) the data communication baud rate must be increased significantly. In fact, large General Motors trucks already operate at a baud rate of 9600, and many passenger vehicles are soon expected to employ computer systems communicating at a baud rate of 8192. Present day hand-held display tools are not well adapted to receiving data at such baud rates. Second, with the increase in baud rate and increase in the number of on-board computers and sensors, there comes a very substantial increase in the volume of data which must be analyzed. To perform a full and complete analysis of such highly computer intensive vehicles would require far too many switches, knobs and light emitting displays to be practical.

Additionally, it should be appreciated that as the analysis of the vehicular data becomes more sophisticated, the computer programs developed to carry out the analysis will become very complex. Yet, with each new model year, the format of the data being transmitted from the on-board computer is subject to change. In order to minimize the changes in the complex diagnostic computer program, it would be desirable to provide an interface between the on-board vehicle computer and the off-board test computer which could adapt to variations in the baud rates and types of data streams being generated by different vehicular computers. Thus, there is a need for a communications adapter circuit which is capable of receiving data from a wide variety of on-board vehicular computers and transforming these varied data streams from car to car into a standard format which would be readily accepted by the test computer.

Accordingly, consistent with the rapidly expanding use of on-board computer systems, there is a corresponding need for test equipment which is capable of analyzing all facets of the vehicle's operation, including the on-board computer operation.

It is, therefore, a principle objective of the present invention to provide a communications adapter apparatus which will facilitate communications between the on-board computer system of an automotive vehicle and a test and a test computer used to analyze the data transmitted from the on-board computer.

It is another objective of the present invention to provide a communications adaptor apparatus which is capable of transmitting commands to an on-board computer vehicle system as well as receiving data from the vehicle computer system.

It is yet another objective of the present invention to provide a communications adapter apparatus for coupling the on-board vehicle computer system with an outboard system, such as a microcomputer system, to permit diagnostic tests to be performed on a real time basis with vehicle operation.

It is yet a further objective of the present invention to provide a communications adapter apparatus in the form of a circuit board capable of being directly connected to the control bus, data bus, and address bus of an outboard microcomputer.

It is an additional objective of the present invention to provide a communications adapter apparatus which is capable of receiving a wide variety of data streams and baud rates.

It is a further objective of the present invention to provide a communications adapter apparatus which is capable of performing a self diagnosis on the vehicle interface.

It is still another objective of the present invention to provide a communications adapter circuit which is capable of depositing data directly into the memory map of the test computer.

It is still a further objective of the present invention to provide a communications adapter circuit whose control program may be readily updated to adjust for future changes in vehicle computers.

To achieve the foregoing objectives, the present invention provides a communications adapter circuit for permitting data communications at variable baud rates between an on-board vehicle computer and a test computer which is programmed to analyze data received from the on-board vehicle computer. The adapter comprises a first interface means for transmitting at least one command from the communications adapter circuit to the on-board vehicle computer. The interface means is adapted for receiving a stream of data from the on-board vehicle computer in response to the command. The adapter further comprises a second interface means for permitting the communications adapter circuit to share the bus structure of the test computer. A dual-ported memory connected to the first and second interface circuits is provided for storing data received from the on-board vehicle computer and for enabling a direct transfer of the stored data to the data bus of the test computer. An addressing control means connected to the dual-ported memory is provided for assigning the dual-ported memory a range of address locations in the memory map of the test computer.

For a more complete understanding of the invention, its objects and advantages, reference may be had to the following specification and to the accompanying drawings.

DESCRIPTION OF THE PREFERRED EMBODIMENT

Figure 1:
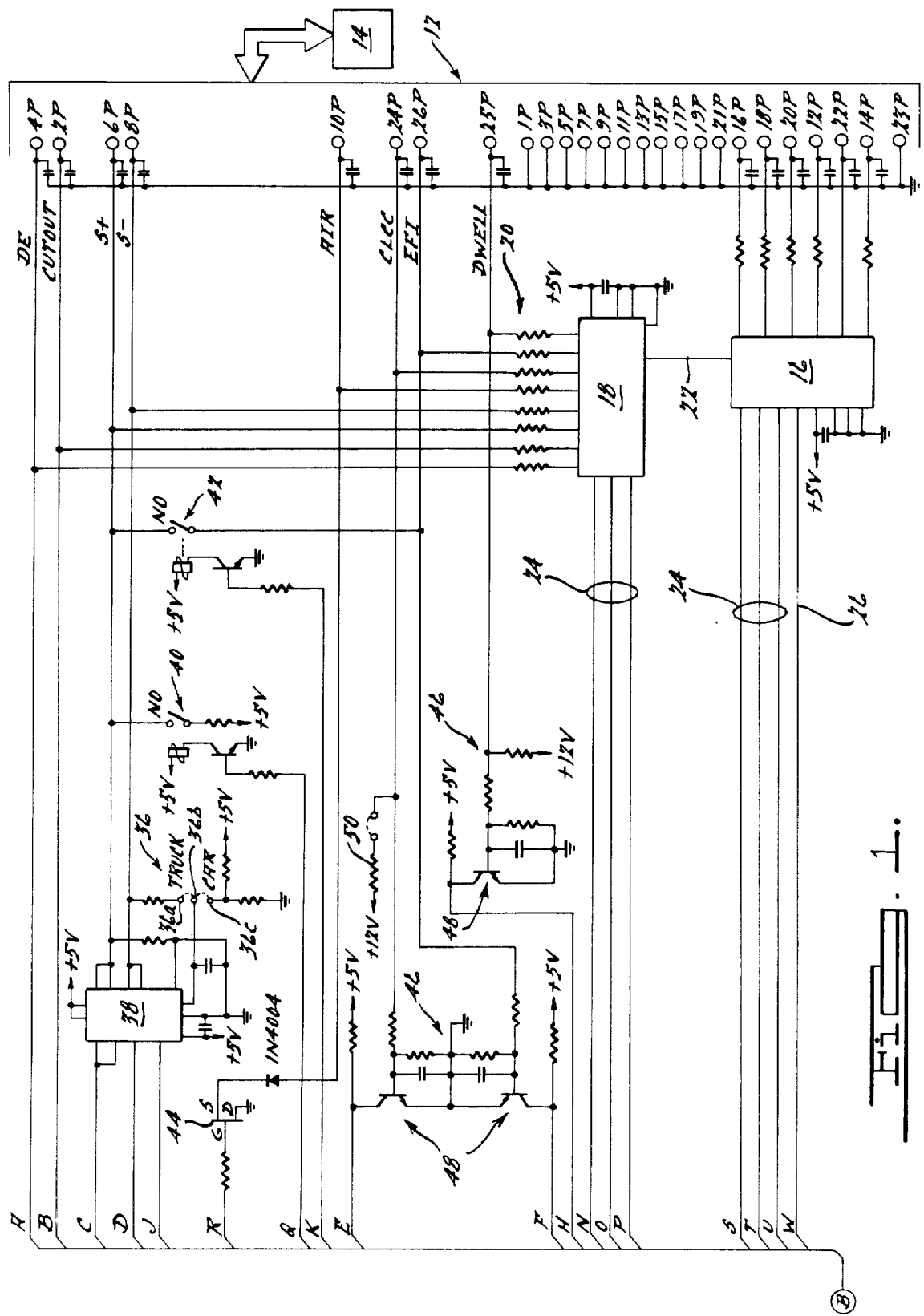
FIGS. 1 through 4 comprise a schematic diagram of the adapter circuit of the invention.
Figure 2:
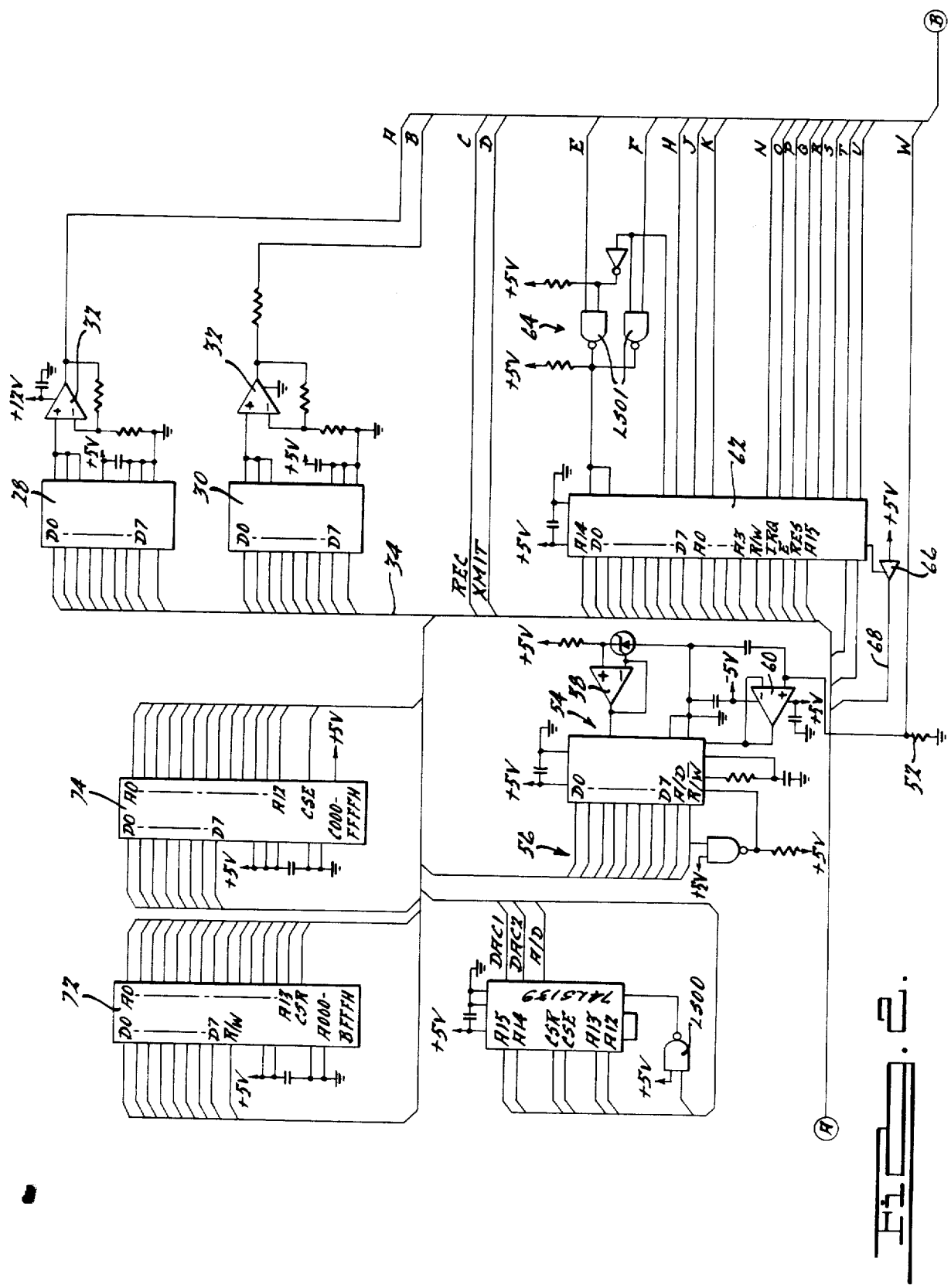

FIGS. 1 through 4 illustrate the circuit of the presently preferred embodiment. Due to space limitations, the circuit has been broken down into four parts comprising FIGS. 1 through 4. FIGS. 1 and 2 contact through point B, FIGS. 3 and 4 share common element 10 and FIGS. 2 and 4 connect through point A. The circuit illustrated is adapted for connection between an on-board vehicle computer and a test computer. Description of the circuit will commence at the point of attachment to the on-board vehicle computer and will proceed to the point of attachment to the test computer.

Referring to FIG. 1, the circuit is adapted for coupling to the on-board vehicle computer through a 26 pin ribbon connector 12. The connection may be made through a ribbon cable to the on-board vehicle computer represented diagrammatically at 14. The individual pins of ribbon connector 12 have been given their customary numerical designation followed by the letter "p". Preferably, each input pin has an adjacent ground for shielding purposes. Coupled to connector 12 as indicated is a first analog switching circuit 16 and a second analog switching circuit 18. Both circuits provide eight resistively coupled inputs and one output and each may be implemented using a 4051B integrated circuit. As illustrated, all eight inputs 20 of second analog switching circuit 18 are coupled to pins on the ribbon connector 12. The output 22 of switching circuit 18 is coupled to one of the inputs of switching circuit 16. The remaining inputs of switching circuit 16 are available for connection to the pins of connector 12 as illustrated. The output 26 of switching circuit 16 is coupled to bus line W. Switching circuits 16 and 18 both include three address select leads 24 upon which a three bit address signal may be placed to select one of the eight inputs for connection to the output. The three bit address select signal is supplied by circuitry yet to be discussed. Generally speaking, however, the analog switching circuits may be appropriately addressed to establish an analog connection of selected pins of connector 12 with line W.

With reference to ribbon connector 12, beginning at the top of the diagram, pins 4p and 2p are the diagnostic enable and cylinder cut-out terminals. These are coupled via lines A and B to first and second D-A converters 28 and 30, shown in FIG. 2. These D to A converters act through amplifiers 32 to provide selected analog voltages to the diagnostic enable and cylinder cut-out terminals in response to digital data on preprocessor bus 34. The signal on the diagnostic enable signal determines the baud rate at which communications occurs between the on-board vehicle computer and the circuit of the invention. The cylinder cut-out terminal may be energized to turn off the injector to a particular vehicle cylinder, in order to measure an rpm drop indicative of the cylinder's performance. By utilizing D to A converters 28 and 30, the invention is capable of providing the on-board vehicle computer with any voltage it requires. This is an advantage, since the invention can be adapted to work with a wide range of different vehicle makes and models. In addition, as new vehicle makes and models are introduced, with new and more advanced on-board computers, the voltages produced by the invention can be changed in software.

Continuing with ribbon connector 12, pins 6p and 8p are the plus and minus sides of a high speed serial communication line. The high speed serial communication line is a two-wire party line. Normally, the plus side is switched to positive with respect to the minus side in a differential configuration. In general, most passenger cars use a single wire communication line, while diesel trucks use the dual wire communication line. In order to accommodate both, the circuit is provided with a jumper set up 36. When diagnosing a truck, the jumper is connected between terminals 36A and 36B. When diagnosing a passenger car the jumper is connected between terminals 36B and 36C. The high speed serial communication lines feed a line driver/receiver circuit 38 which in turn couples to the receive line C and the transmit line D of bus 34. If desired, the jumper 36 may be replaced by a software controlled switch.

Connected to the plus side of the high speed communication line is a first software controlled relay 40 which, when activated, connects a pull-up resistor to the plus side of the high speed serial data line. This pull-up resistor is used when communicating with certain on-board vehicle computers. A second software controlled relay 42 is coupled to the plus side of the high speed serial line. This relay, when activated, provides a short between pin 6p and pin 26p of connector 12. Pin 26p is the electronic fuel injection line. In some instances, high speed data, at a baud rate of typically 8192, comes in on pin 26p. Hence, by shorting pins 6p and 26p, high speed data is routed to the line driver/receiver circuit 38.

Pin 10p of ribbon connector 12 is the air measurement solenoid connection. That pin is coupled to transistor 44 which, under software control, either open circuits or grounds pin 10p. By providing a ground on that pin, a current path is established through the vehicle's air measurement solenoid which causes air from the air pump to be diverted to the exhaust manifold. Pins 24p and 26p are the 160 and 180 baud inputs. These pins are separate because some vehicles send data out on one pin and other vehicles send data out on another pin, rather than having a switching arrangement. Accordingly, two inputs are provided. More specifically, pin 24p is for carbureted type vehicles and pin 26p is for electronic fuel injected vehicles. Also, as mentioned above, high speed 8192 data also comes in on pin 26p. Both of these pins are intercepted by resistor divider networks 46 and NPN Darlington transistors 48 which are used to shift the incoming signal levels up to zero to five volt transitions. In order to accommodate twelve volt systems found in some diesel engines, an auxiliary twelve volt pull-up 50 may be jumpered into the circuit. As with the other jumpers, this jumper may be replaced with a software controlled switch, if desired.

Pin 25p is the solenoid dwell input used by some vehicles to convey dwell information. Other vehicles provide torque converter clutch input signals on this same pin. The dwell pin is also coupled through a resistor divider network 46 and Darlington transistor 48 to provide appropriate signal levels as described above.

Pins 16p, 18, 20p, 12p, 22p and 14p are auxiliary probe inputs. These are coupled to first analog switching circuit 16 as illustrated. These six probe channels are provided in case the diagnostic routine requires sensing signals produced on one or more standard vehicle interface wires somewhere within the engine system. As described above, the analog switching circuits may be addressed to connect a selected input line to output line 26. The input lines are resistively coupled, and output 26 is coupled to scaling resistor 52 shown in FIG. 2. The input resistor in conjunction with scaling resistor 52 provides a scaling factor, so that input voltages may be into the appropriate range for interpretation by the circuit.

Referring to FIG. 2, the invention further comprises a volt meter circuit 54 which reads voltages on line W and provides a digital representation of those voltages on volt meter data bus 56. The digital volt meter may be implemented using a ADC0804 integrated circuit. A reference voltage is supplied by reference amplifier 58, while unity gain amplifier 60 serves as a buffer to protect the volt meter circuit.

The circuit further comprises an interface circuit 62 for coupling between preprocessor bus 34 and the portion of the circuit illustrated in FIG. 1. Interface circuit 62 may be implemented using a 6522 integrated circuit having its input/output leads coupled to wires H, J, K and N–U, as illustrated. Circuit 62 is also coupled to steering logic gates 64, which provide low speed 160 baud data communication with line E (the carbureted type vehicle line) and line F (the electronic fuel injected type vehicle line). The circuit is adapted for providing interrupt signals to the test computer. Interrupt signals are generated using interface circuit 62 to control a tri-state buffer 66. Tri-state buffer 66 toggles between its normal tri-state (high impedance state) and the five volt logic level when an interrupt is sent. The interrupt signal is sent on interrupt line 68, which in turn couples to the test computer's interrupt request terminal. Many popular microcomputers provide a plurality of interrupts, typically prioritized so that some interrupts take precedence over others.

The present invention may be readily configured to generate a selected one of a group of interrupts, so that the invention is compatible with many hardware configurations. For purposes of illustrating the invention, it will be assumed that the test computer is a microcomputer compatible with IBM PC standards. Accordingly, interrupt #2 (typically reserved for special hardware and software applications) or interrupt #3 (typically reserved for the asynchronous communications port #1) are suitable interrupts for practicing the invention. Depending on the particular hardware configuration of the test computer, other interrupts are also usable. Regardless of which interrupt is used, the desired interrupt is selected by connecting the appropriate jumper 70 shown in FIG. 3. In some instances, where the test computer is fast enough, it may not be necessary to implement an interrupt driven operation.

With continued reference to FIG. 2, the invention further comprises random access memory or RAM 72 and read only memory in the form of EEPROM 74. Preferably, RAM 72 is at least 8K bytes and the EEPROM 74 may be implemented using a 2732A integrated circuit.

Figure 3:
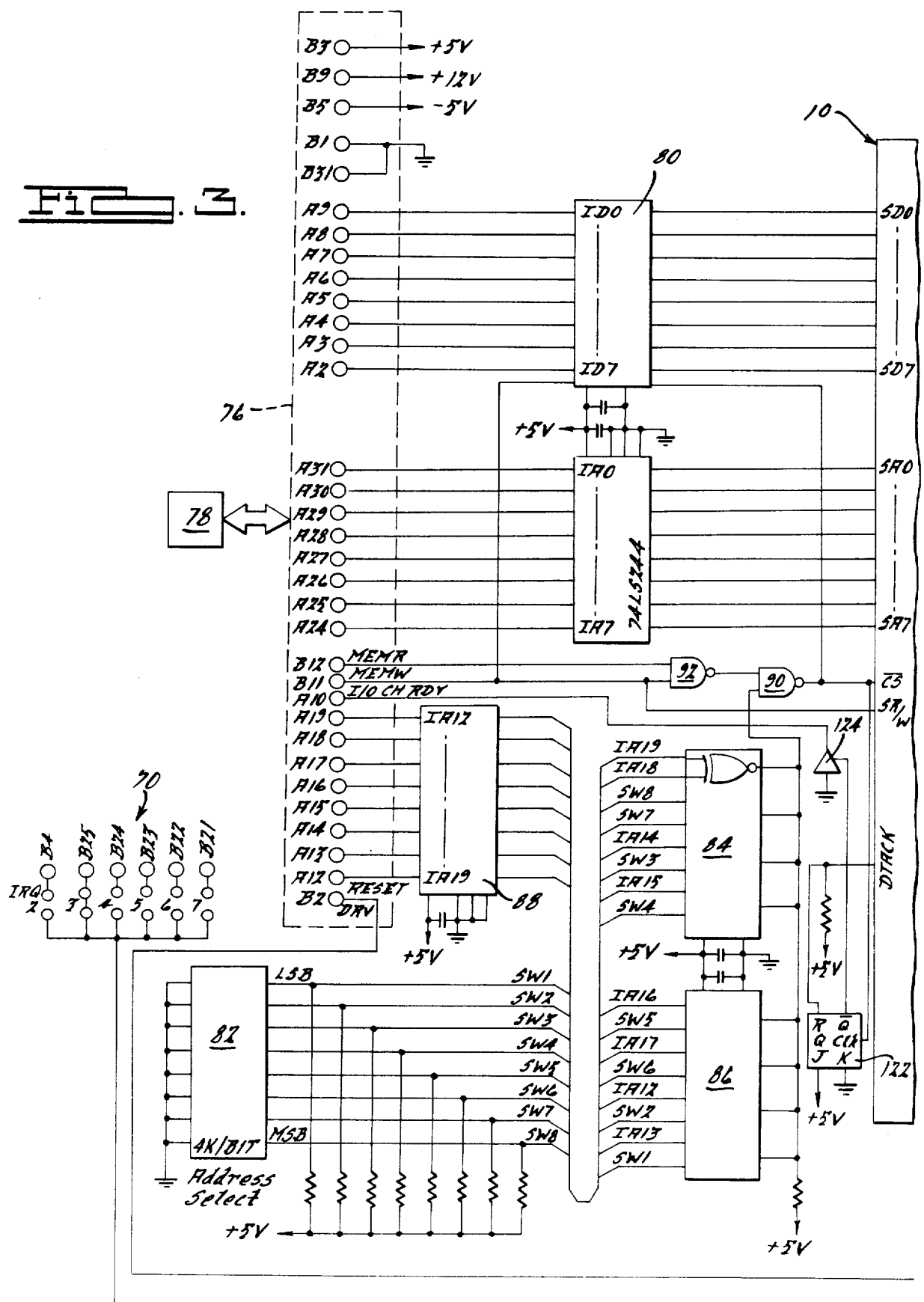
Figure 4:
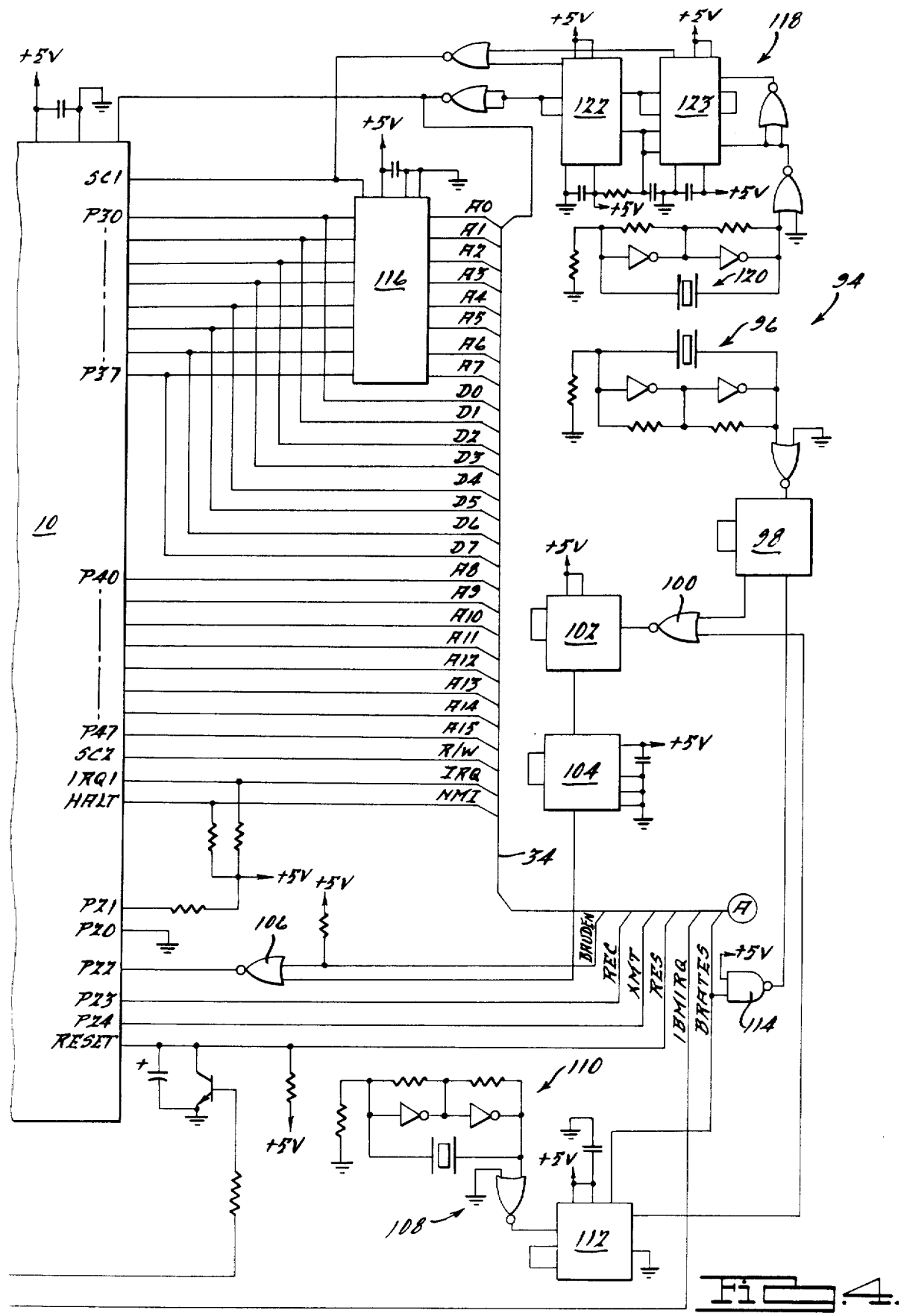

At the heart of the circuit of the invention is peripheral controller 10, which is shown in FIGS. 3 and 4. Peripheral controller 10 may be implemented using an intelligent peripheral controller chip such as an MC68121L-1. Peripheral controller 10 provides 128 bytes of dual-ported RAM. The dual-ported RAM provides a vehicle for devices on two separate buses to exchange data without directly affecting the devices on the other bus. The dual-ported RAM is accessible from the internal CPU of peripheral controller 10 and accessible synchronously or asynchronously to the system bus through a first port. The controller 10 has semaphore registers which are provided as a software tool to arbitrate shared resources such as the dual-ported RAM. The semaphore registers are accessible from both buses in the same way each bus accesses the dual-ported RAM. In addition, peripheral controller 10 also includes input/output ports. In FIGS. 3 and 4, the terminals of peripheral controller 10 have been given the customary pin assignment designations. For further information concerning the peripheral controller 10 reference may be had to the product advance information specifications for the MC68121 integrated circuit family of intelligent peripheral controllers, Motorola Semi-conductors, 3501ED, Bluestein Boulevard, Austin, Tex. 78721.

In general, peripheral controller 10 serves as a preprocessor for data input from the on-board vehicle computer. The data is processed to a standardized format for transmission to the system bus of the test computer. Communication between the on-board vehicle computer and the test computer is via the dual-ported RAM found within peripheral controller 10. Accordingly, in FIG. 3 the test computer system bus is indicated generally at 76. As stated above, for purposes of illustrating the principles of the invention, it has been assumed that the test computer comprises a microcomputer compatible with the IBM PC specification. The test computer is indicated diagrammatically at 78. It will be understood that the system bus of computer 78 is coupled to the circuit of the invention according to the connections designated at 76.

In practice, the circuit of the invention may be assembled on a printed circuit card having the appropriate edge connector for plugging directly into an expansion slot on the test computer motherboard. When this is done, power for the circuit is supplied by the test computer system's power supply. Pins A-9 through A-2 of test computer system bus 76 comprise the eight bit data bus of the test computer. These pins are coupled through a bidirectional transceiver 80 which allows data to flow either into or out from the dual-ported memory of peripheral controller 10. The direction of data flow is controlled by the memory write command (MEMR) on pin B-12 of bus 76. When the memory write signal is active, indicating a memory write operation, data is inbound from the test computer bus 76 to the dual-ported RAM of peripheral controller 10. When the memory write command is in a read state, data flows in the opposite direction. Bidirectional transceiver 80 may be implemented using a 14LS245 integrated circuit, which provides a tri-state (high impedance state) to the test computer side at all times, unless the test computer specifically accesses the memory space at which the dual-ported RAM is located. In this regard, address select DIP switch package 82 is provided. The DIP switches may be set to select or designate where in the test computer system's memory map the dual-ported RAM may be addressed.

This is an important feature in adapting the invention to a wide variety of different computer system configurations. To illustrate, the IBM PC computer has the capability of addressing one megabyte of controller 10 memory. Typically, high memory addresses are reserved for system ROM, while low addresses are reserved for jump table vector addresses stored in RAM. In general, the invention is configured so that the dual-ported RAM of peripheral controller 10 may be located at an address not used by the test computer system. Accordingly, the address of the dual-ported RAM can be positioned at any 16K byte boundary by setting the appropriate DIP switches on DIP switch package 82. For example, if the test computer system has 128K bytes of memory, then the dual-ported RAM may be located above this, say at starting address 256K. If the computer system has 640K of random access memory, then the dual-ported RAM may be set to address 672K, for example. Of course, the foregoing address values are merely examples, as any 16K boundary outside of the normal random access memory space may be selected.

In order to insure that the test computer does not access the dual-ported RAM unless the correct address is used, the invention provides exclusive OR gates 85 and 86 which are tied to DIP switch package 82. The address pins A-19 through A-12 (the highest addresses of the test computer system bus 76) are connected through buffer 88 to the exclusive OR gates 84 and 86. The exclusive OR gates compare the address on pins A-19 through A-12 with the DIP switch settings of DIP switch package 82. An exact match of the DIP switch setting and the bus address valve must occur before the test computer is permitted access to the dual-ported memory. The result of this comparison is fed to NAND gate 90 into which is also fed the output of NAND gate 92. NAND gate 92 is responsive to the memory read and memory write signals from the test computer system bus. Thus, NAND gates 90 and 92, together with the DIP switch package 82 and exclusive OR gates 84 and 86 provide a means by which the test computer can communicate with the dual-ported RAM at a specified address within the test computer system's memory space.

Turning now to FIG. 4, the on-board vehicle computer side of peripheral controller 10 will be discussed in greater detail. The circuit includes a first baud rate generator shown generally at 94. The first baud rate generator includes a crystal controlled oscillator 96 operating at 4.9152 MHz., which feeds a divide by two circuit 98. The output of divide by two circuit 92 is fed through steering logic gate 100 to a second divide by two circuit 102 and then to a divide by sixteen circuit 104. The output of circuit 104 is fed through logic gate 106 to the pin P-22 of peripheral controller 10. Peripheral controller 10 has an internal serial communications adapter and pin P-22 serves as the external clock input. Gate 106 may be switched off to disconnect the baud rate generator from peripheral controller 10 when the peripheral controller chip is being reset. This is done through software via the baud enable line (BAUDEN). The baud rate generator 94 is capable of providing a baud rate of 9600.

The invention further includes a second baud rate generator shown generally at 108. Second baud rate generator 108 comprises crystal controlled oscillator 110 operating at a frequency of 4.194 MHz. Oscillator 110 drives divide by two circuit 112 whose output is coupled to steering logic gate 100. The second baud rate generator provides a baud rate of 8192. In order to select which baud rate generator is connected to the peripheral controller 10 a baud rate selection gate 114 is provided. In addition to the high speed communication provided by baud rate generators 94 and 108, the invention is also capable of communicating at lower baud rates found in many existing on-board vehicle computers. The presently preferred embodiment is capable of communicating at 80 baud and 160 baud, both popular low speed baud rates. These low speed rates may be generated internally by the peripheral controller 10.

As illustrated, the higher order address lines of the local bus of controller 10 (pins P-40 through P-47) are coupled directly to the preprocessor bus 34. Pins P-31 through P-37 represent the lower order address lines and data lines in a multiplexed configuration. In order to demultiplex the address and data information, latch circuit 116 is provided. Latch circuit 116 is clocked by a latch clocking circuit shown generally at 118. Circuit 118 comprises a crystal controlled oscillator 120 operating at 4.0 MHz. Oscillator 120 is fed through a pair of divide by two circuits 122 and 123. Circuit 123 provides a 1 MHz. signal for clocking the latching circuit 116.

The circuit further comprises a JK flip-flop 122 which is coupled to tri-state buffer 124. Flip-flop receives a clocking signal from the Chip Select pin of peripheral controller 10. The acknowledge terminal DTACK of controller 10 is coupled to the reset terminal of flip-flop 122. The flip-flop provides the delay required for proper timing with the test computer.

In operation, the circuit of the invention is plugged into the motherboard of the test computer and ribbon connector 12 is coupled via the appropriate connector to the on-board vehicle computer. If required, additional probes may be connected to various engine sensors using the six channel analog inputs provided by pins 12p through 22p on connector 12. For example, pin 22p may be connected to the oxygen sensor on the vehicle. The test computer is preferably provided with a separate diagnostic program which orchestrates the operation of the circuit by instructing the circuit fetch predetermined data from the vehicle computer at the appropriate baud rate for the vehicle computer. The diagnostic program can also be implemented to cause the circuit to send commands to the on-board vehicle computer in order to simulate certain operating conditions. This may be done using the D to A converters 28 and 30 which can be operated via digital commands to produce a given voltage needed to activate a given on-board vehicle computer function or to stimulate a given vehicle sensor. As mentioned above, the invention also has the ability to perform dynamic power tests by turning off the injectors to specified engine cylinders. The change in vehicle rpm can then be sensed to determine whether the turned off cylinder is operating within specifications. In general, the invention affords the ability to perform a wide variety of different tests, as the invention is adapted to interface directly with the on-board computer and is adapted to provide the necessary signals to stimulate certain sensors or to simulate certain operating conditions. It is anticipated that the test computer will be outfitted with diagnostic software having artificial intelligence abilities. In other words, the diagnostic software will comprise a so called "expert system" which is able to diagnose problems in a wide range of different makes and models of engines and is further able to suggest possible cures, based on artificial intelligence algorithms.

In order to relieve the expert system software from the burden of communicating with a wide variety of makes and models of engines, the present invention preprocesses the data received from the on-board vehicle computer and manipulates it into a predefined data structure which is unchanged throughout all makes and models tested. In other words, the invention provides a first interface means for transmitting commands from the circuit to the on-board computer and for receiving a stream of data from the on-board computer in response to the commands. The invention includes a second interface circuit for permitting the circuit of the invention to share the bus structure of the test computer. In essence, this allows the circuit to communicate with the on-board vehicle computer in the language which the vehicle computer understands. The circuit of the invention then translates the data received from the vehicle computer into a standardized format which the test computer is able to understand. The information in standardized format is made available to the test computer by placing that information directly into the test computer's memory space. This is accomplished by means of the dual-ported RAM found in the peripheral controller circuit 10. The dual-ported RAM is placed in the memory map of the test computer, but outside of the normal memory space used by that computer to perform its normal computations. Stated differently, the expert system running on the test computer would reside in a portion of the computer's memory space which is different from the space occupied by the dual-ported RAM. The expert system software would, however, be given knowledge of the address location of the dual-ported RAM, so that the expert system software could access the information stored therein and also send commands to the circuit of the invention by placing instructions in the dual-ported RAM space. The circuit allows both the test computer and the peripheral controller circuit to share the dual-ported RAM by controlling the data flow through bidirectional transceiver circuit 80. Through the use of this dual-ported RAM sharing scheme, the invention is capable of communicating at very rapid rates. Although a 128 byte dual-ported RAM circuit is used in the presently preferred embodiment, the invention is capable of being implemented using different sized dual-ported RAM circuits. In general, the larger the shared memory space, the more data than can be made available for rapid transfer between controller circuit and test computer.

In order to perform the preprocessing of data, the invention loads the input data stream from the vehicle computer into RAM 72. There the data is buffered while being manipulated into the standardized data structure expected by the expert system software. The program for performing this data manipulation may be stored in the EEPROM 74. The internal CPU of peripheral controller 10 operates on the buffered data within RAM 72 in accordance with the instructions provided by the program stored in EEPROM 74. Once the data has been manipulated into the expected format, it is transferred to the dual-ported RAM, where it is available to be accessed by the expert system software. One advantage of providing the instructions or program in EEPROM 74 is that the circuit can be made to operate upon being powered up. Of course, certain changes in on-board vehicle computer structure, and changes in the vehicle functions controlled by on-board computers are expected. In order to accommodate changes, the invention provides an alternate way of manipulating data which is capable of being changed or updated from time to time. In order to keep abreast of changes in the automotive industry, RAM 72 may be loaded with alternate operating instructions to take the place of the instructions provided in EEPROM 74. These alternate instructions can be uploaded through the dual-ported RAM using a floppy disc drive on the test computer. There is sufficient space within RAM 72 to contain both the necessary operating instructions and also the buffer space needed to manipulate the vehicle data into the standard format expected by the expert system software.

As an even further convenience when diagnosing a wide variety of different makes and models, the invention provides the ability to automatically select the appropriate baud rate for communication with the on-board vehicle computer. As previously indicated, the invention is presently configured to provide baud rates at 80, 160, 8192 and 9600. The peripheral controller, under instructions contained in EEPROM 74 or RAM 72, commences communicating with the on-board vehicle computer at the most likely baud rate (typically at a lower baud rate). It will commence communication at this lower baud rate for a predetermined communication interval and will then pause and listen to the communication line for a second predetermined time. If during the second time the peripheral controller receives a request of or data at a different baud rate, the controller will switch to that different baud rate and continue communicating. Thus, for example, the invention may be implemented to commence communication at 160 baud and then switch to 8192 baud if the on-board vehicle computer is so equipped. Not only does this allow the circuit to automatically select the proper communication speed, but is also allows the invention to determine the type of vehicle being diagnosed, based on the baud rate of communication established. Moreover, not only does the invention steer itself to the correct baud rate, but is also has the ability to determine the correct communication protocol, i.e., the correct number of start bits, stop bits, data bits and check sums, by sequentially trying each available protocol until one works correctly. All of this information can be made available to the test computer via the dual-ported RAM, so that the expert system software can determine what type of vehicle and what type of equipment is being diagnosed even if the human operator should give insufficient or faulty information.

By virtue of the invention's ability to run updated preprocessor software, new communication protocols can be added as required, without deleting the older protocols from the protocol selection set. The invention is thus fully upwardly compatible. As new protocols are added, the preprocessor software can be simply upgraded via floppy disc without changing the older protocols. Hence, the invention will be capable of communicating with older, obsolete makes and models as well as the latest models.

According to present predictions, the vehicle of the future will include perhaps dozens of on-board vehicle computers, all sharing a common network. Although the networking protocols have yet to be fully worked out for such vehicles, the invention can be readily adapted to accommodate these more complex protocols, as the preprocessor software can be adapted to recognize identifying headers used to denote information intended for a particular computer vis a vis information intended for global use by all computers on the network. The invention can be configured to behave as one of the computer systems on the network, sharing packets of information in the same fashion as the other network computers do. The advantage of this approach is that the test computer running expert system software need not concern itself with the details of network communication.

From the foregoing it will be seen that the present invention provides a versatile interface between the on-board vehicle computer and a test computer. Through this invention, complex expert system software can be significantly economized, since that software must no longer be updated with each change in on-board vehicle computer structure or communication protocol. The invention is capable of communicating at high speeds through the use of dual-ported RAM memory which allows commands and data to be communicated from and to the test computer's bus structure directly. The invention is thus capable of communicating to expert system software in a standardized, high speed fashion. The invention provides a wide range of different possible communication baud rates, as it provides both discrete hardware baud rate generators in addition to the software controlled baud rate generator furnished with the peripheral controller device. The circuit is capable of generating and measuring a wide range of analog voltages, making it easy to interface with many different makes and models of automotive systems.

While the invention has been described in its presently preferred embodiment, it will be understood that the invention is capable of modification and change without departing from the spirit of the invention as set forth in the appended claims.

What is claimed is:

1. A communications adapter circuit for permitting data communications at variable baud rates between an on-board vehicle computer and a test computer which is programmed to analyze data received from said on-board vehicle computer, comprising:

first interface means for producing a variable command signal which will cause said on-board vehicle computer to transmit data to said communications adaptor circuit;

second interface means for receiving a stream of unprocessed data from said on-board vehicle computer in response to said command signal;

third interface means for connecting said communications adaptor circuit to a bus structure of said test computer, such that said communications adaptor circuit shares the bus structure of said test computer;

dual-ported memory means connected to said second and third interface means for storing said stream of unprocessed data received from said on-board vehicle computer and enabling a direct transfer of said stored stream of unprocessed data to a data bus in said bus structure of said test computer;

addressing control means connected to said dual-ported memory means for assigning said dual-ported memory means a predetermined range of address locations in a memory map of said test computer which will enable said test computer to access said steam of unprocessed data stored in said dual-ported memory means; and baud rate selection means for enabling said stream of unprocessed data to be received at the baud rate transmitted by said on-board vehicle computer, said baud rate selection means including oscillator means for allowing said adapter circuit to process data on at least one high speed baud rate greater than 160 baud.

2. The communications adaptor circuit according to claim 1, wherein said communications adaptor circuit includes second memory means, connected to said second interface means, for storing said stream of unprocessed data transmitted from said on-board vehicle computer to said communications adaptor circuit, and programmed controller means, connected to both said dual-ported memory means and said second memory means, for preprocessing said stream of unprocessed data before transferring said processed data stream to said dual-ported memory means.

3. The communications adapter circuit according to claim 2, wherein said first interface means includes digital to analog converter means for converting a digital signal from said programmed controller means into said variable command signal for transmission to said on-board vehicle computer.

4. The communications adapter circuit according to claim 2, including initialization means for enabling a data preprocessing program for said programmed controller means to be downloaded into said second memory means for said test computer through the third interface means.

5. The communications adapter circuit according to claim 4, wherein said dual-ported memory means and said programmed controller means comprise an intelligent peripheral controller, and said second memory means comprises random access memory.

6. The communications adapter circuit according to claim 1, wherein said second interface means includes connector means having a plurality of input ports for receiving signals from said on-board vehicle computer, switching circuit means for selectively transmitting signals from one of said ports to a volt meter circuit means, and said volt meter circuit means for providing a digital representation of the signal transmitted by said switching means to said programmed controller.

7. The communications adapter circuit according to claim 1, wherein said addressing control means includes switchable means, connecting the system bus of the test computer to input gating means of the intelligent peripheral controller, for selecting said predetermined range of address locations, and said input gating means, connecting said switchable means and said system bus of the test computer with the input of the peripheral controller for comparing said predetermined range of address locations with a memory address placed on an address bus in said bus structure of said test computer.

8. A communications adapter circuit for plugging directly into a bus structure of a test computer which is programmed to analyze data from an on-board vehicle computer, comprising:

a microcomputer-based controller;

first interface means for transmitting a command signal of variable amplitude to said on-board vehicle computer under the direction of said controller which will cause said on-board computer to transmit a stream of unprocessed data to said communications adapter circuit;

second interface means in communication with said controller for receiving said stream of unprocessed data from said on-board vehicle computer in response to said command signal;

third interface means for connecting said communications adapter circuit directly to said bus structure of said test computer, such that said communications adapter circuit shares said bus structure of said test computer;

first memory means connected to said controller and to said second interface means for storing said stream of unprocessed data transmitted from said on-board vehicle computer, said first memory means enabling said controller to preprocess data from said unprocessed stream of data;

dual-ported memory means connected to said second and third interface means for enabling a direct transfer of said stored preprocessed data to a data bus in said bus structure of said test computer; and addressing control means connected to said dual-ported memory means for assigning said dual-ported memory means a predetermined range of address locations in a memory map of said test computer which will enable said test computer to access data stored in said dual-ported memory means.

9. The communications adapter circuit according to claim 8, including baud rate selection means for enabling said stream of unprocessed data to be received at the baud rate transmitted by said on-board vehicle computer.

10. The communications adapter circuit according to claim 9, wherein said baud rate selection means includes oscillator means for allowing said adapter circuit to process data at least on one high speed baud rate greater than 160 baud.

11. The communications adapter circuit according to claim 10, wherein said oscillator means provides two high speed baud rates and said baud rate selection means includes gate means responsive to a signal from said controller for selecting between said two high speed baud rates.

12. The communications adapter circuit according to claim 8, wherein said second interface means includes connector means having a plurality of input ports for receiving signals from said on-board vehicle computer, switching circuit means for selectively transmitting signals from one of said ports to a volt meter circuit means and said volt meter circuit means for providing a digital representation of the signal transmitted by said switching means to said controller.

13. The communications adapter circuit according to claim 8, wherein said addressing control means includes switchable means, connecting the system bus of the test computer to input gating means of said controller, for selecting said predetermined range of address locations, and said input gating means connecting said switchable means and said system bus of the test computer with the input of the peripheral controller for comparing said predetermined range of address locations with a memory address placed on an address bus in said bus structure of said test computer.

14. The communications adapter circuit according to claim 8, including initialization means for enabling a data preprocessing program for said controller to be downloaded into said first memory means from said test computer through the third interface means.

15. The communications adapter circuit according to claim 14, wherein said data preprocessing program is loaded into said first memory means through said dual-ported memory means after said dual-ported memory means receives said preprocessing programs from said test computer through said third interface.

16. The communications adapter circuit according to claim 8, wherein said predetermined range of address locations defines a different memory space than the random access memory space provided for said test computer.

17. The communications adapter circuit according to claim 8, wherein said controller includes read only memory means for storing a program for acquiring data from said on-board vehicle computer.

18. A communications adapter circuit for plugging directly into a bus structure of a test computer which is programmed to analyze data from an on-board vehicle computer, comprising:

a microcomputer-based controller;

first interface means for transmitting command signals to said on-board vehicle computer under the direction of said controller which will cause said on-board computer to selectively transmit a stream of unprocessed data to said communications adapter circuit and perform predetermined on-board vehicle computer functions, said first interface means including digital to analog means for producing said command signals with a variable amplitude;

second interface means in communications with said controller for receiving said stream of unprocessed data from said on-board vehicle computer in response to at least one of said command signals;

third interface means for connecting said communications adapter circuit directly to said bus structure of said test computer, such that said communications adapter circuit shares said bus structure of said test computer; and first memory means connected to said controller and to said second interface means for storing said stream of unprocessed data received from said on-board vehicle computer for subsequent transmission to said test computer through said third interface means, said first memory means enabling said controller to preprocess data from said unprocessed stream of data.

19. The communications adapter circuit according to claim 18, wherein said second interface means includes connector means having a plurality of input ports for receiving signals from said on-board vehicle computer, switching circuit means for selectively transmitting signals from one of said ports to a volt meter circuit means, and said volt meter circuit means for providing a digital representation of the signal transmitted by said switching means to said controller.

20. A communications adapter circuit for plugging directly into a bus structure of a test computer which is programmed to analyze data from an on-board vehicle computer, comprising:

a microcomputer-based controller;

first interface means for transmitting a command signal to said on-board vehicle computer under the direction of said controller which will cause said on-board computer to transmit a stream of unprocessed data to said communications adapter circuit;

second interface means in communication with said controller for receiving said stream of unprocessed data from said on-board vehicle computer in response to said command signal, said second interface means including connector means having a plurality of input ports for receiving signals from said on-board vehicle computer, switching circuit means for selectively transmitting signals from one of said ports, and volt meter circuit means for providing a digital representation of the signal transmitted by said switching means;

third interface means for connecting said communications adapter circuit directly to said bus structure of said test computer, such that said communications adapter circuit shares said bus structure of said test computer; and first memory means connected to said another and to second interface means for storing said stream of unprocessed data received from said on-board vehicle computer for subsequent transmission to said test computer through said third interface means, said first memory means enabling said controller to preprocess data from said unprocessed stream of data.

21. A method of obtaining data from on-board vehicle computers having different transmission baud rates which will also enable the type of on-board vehicle computer to be determined, based on the baud rate of communication established, comprising the steps of:

providing a communications adapter circuit capable of communicating with an on-board vehicle computer at a plurality of baud rates;

commencing communication with an on-board vehicle computer at a first predetermined baud rate for a first time interval;

listening for a second time interval to determine if said on-board vehicle computer will transmit a stream of data at said first predetermined baud rate; and switching communication with said on-board vehicle computer to at least one additional predetermined baud rate if communication is not established at said first predetermined baud rate.

22. The method according to claim 21, wherein said communications adapter circuit switches through a plurality of predetermined baud rates with a listening interval provided between each of said predetermined baud rates until communication is established.

* * * * *

UNITED STATES PATENT AND TRADEMARK OFFICE
CERTIFICATE OF CORRECTION

PATENT NO. : 4,853,850

DATED : August 1, 1989

INVENTOR(S) : James E. Krass, Jr., and James F. Neely

It is certified that error appears in the above-identified patent and that said Letters Patent is hereby corrected as shown below:

Title page:

Under references cited, Adcock "4,43,346 should be --4,443,846--;

Column 3, line 55, "contact" should be --connect--;

Column 11, line 3, "is" should be --it--;

Column 11, line 7, "is" should be --it--;

Column 16, line 8, claim 20, "another" should be --controller--.

Signed and Sealed this

Seventh Day of August, 1990

Attest:

HARRY F. MANBECK, JR.

*Attesting Officer*          *Commissioner of Patents and Trademarks*